United States Patent
Eglin

(10) Patent No.: US 6,745,114 B2
(45) Date of Patent: Jun. 1, 2004

(54) PROCESS AND DEVICE FOR DETERMINING IN REAL TIME THE BEHAVIOR OF A CRAFT, IN PARTICULAR OF AN AIRCRAFT

(75) Inventor: Paul Eglin, Aix-en-Provence (FR)

(73) Assignee: Eurocopter, Marignane Cedex (FR)

( * ) Notice: Subject to any disclaimer, the term of this patent is extended or adjusted under 35 U.S.C. 154(b) by 0 days.

(21) Appl. No.: 10/272,293

(22) Filed: Oct. 17, 2002

(65) Prior Publication Data

US 2003/0130768 A1 Jul. 10, 2003

(30) Foreign Application Priority Data

Oct. 18, 2001 (FR) .............................. 01 13435

(51) Int. Cl.⁷ ......................... G06F 15/18; G05B 13/02
(52) U.S. Cl. ............................................ 701/3; 700/31
(58) Field of Search ................... 701/1, 3–5, 7, 701/10, 14; 700/28–31, 54; 244/194–195

(56) References Cited

U.S. PATENT DOCUMENTS

| 5,606,505 A | 2/1997 | Smith et al. | |
| 6,496,741 B1 * | 12/2002 | Whiffen | 700/28 |
| 6,532,454 B1 * | 3/2003 | Werbos | 706/14 |

OTHER PUBLICATIONS

Preliminary Search Report dated Aug. 2, 2001.
Yann Le Gorrec, et al.; "Modal Multimodel Control Design Approach Applied to Aircraft Autopilot Design", Journal of Guidance and Control and Dynamics, AIAA, New York, US, vol. 21, No. 1, 1998, pp. 77–83, XP000780035, ISSN: 0731–5090.

B. Charlet, et al.; "Dynamic Feedback Linearization with Application to Aircraft Control", IEEE, Proceedings of the 27th Conference on Decision and Control, Austin, TX, Dec. 1988. XP010071203, pp. 701–705.

M. B. Tischler; "Assessment of Digital Flight–Control Technology for Advanced Combat Rotorcraft", Journal of the American Helicopter Society, New York, US, vol. 34, No. 4, Oct. 1, 1989, pp. 66–76, XP000132622, ISSN: 0002–8711.

* cited by examiner

*Primary Examiner*—Thu V. Nguyen
(74) *Attorney, Agent, or Firm*—Stevens, Davis, Miller & Mosher, LLP

(57) ABSTRACT

A device for determining in real time the behavior of a craft may include a first device for determining, from a current linear model modeling the behavior of the craft, a vector $\lambda$ illustrating an equilibrium state. A second device is connected to the first device for determining from vector $\lambda$ the values at equilibrium of parameters of the linear model. A third device is connected to the second device for calculating, from at least some of the parameter values, the dynamic component of the behavior of the craft. A fourth device is connected to the first and third devices for introducing the dynamic component into the linear model so as to obtain a new current linear model and to deduce the behavior of the craft therefrom.

8 Claims, 2 Drawing Sheets

PROCESS AND DEVICE FOR DETERMINING IN REAL TIME THE BEHAVIOR OF A CRAFT, IN PARTICULAR OF AN AIRCRAFT

BACKGROUND OF THE INVENTION

The present invention relates to a process and a device for determining in real time the behavior of a craft, in particular of an aircraft.

DESCRIPTION OF THE PRIOR ART

It is known that, for numerous applications pertaining to an aircraft, such as an airplane or a helicopter, in particular for piloted simulations, it is necessary to ascertain the behavior of the aircraft, that is say all its movements, throughout this aircraft's simulated flight domain. To estimate this behavior, a modeling of the various movements to be considered is generally carried out. Two types of modeling may be used for this purpose: nonlinear modeling and linear modeling.

Nonlinear modeling, which makes it possible to describe the behavior of the aircraft by a nonlinear model using flight mechanics equations, is established from a knowledge of the forces which act on the aircraft. In this regard, it is known, for example, that the aerodynamic forces fluctuate with the square of the air speed or that a rotary wing of a helicopter gives rise to nonlinear inertial effects.

A nonlinear model represents reality very faithfully with a rigorous and complete description of the forces and moments which act on the aircraft. Moreover, it is valid throughout the aircraft's flight domain.

However, nonlinear modeling such as this exhibits several drawbacks:

- it is complex and difficult to implement;
- it requires a very long duration of calculation; and
- correction of the corresponding nonlinear model, which presupposes very good knowledge of the equations of the model and of their parameters so as to identify the influential parameters and to make provision for appropriate modifications, is very complex and difficult to implement.

On the other hand, linear modeling which makes it possible to describe the movements of an aircraft by a linear equation (usually a vector equation, for which a state representation is then employed) represents the states of the aircraft by very simple relations. The parameters of which these relations are composed are the dampings, the stabilities and the couplings of the aircraft, as well as the control sensitivities experienced directly by the pilot. These parameters can therefore be easily tailored with respect to the flight.

Linear modeling such as this is therefore simple and can be implemented and corrected speedily and easily.

However, it exhibits a considerable drawback. This linear modeling is valid only locally, about an equilibrium state. Its domain of validity is in principle limited:

- in amplitude (one is constrained to move along a "tangent" to the point of equilibrium); and
- in frequency (the number of natural modes that a linear model can reproduce is related directly to the dimension of its state vector).

Despite all its advantages, this linear modeling cannot therefore be used to estimate, at any instant and throughout the flight domain, the behavior of an aircraft.

SUMMARY OF THE INVENTION

The object of the present invention is to remedy these drawbacks. It relates to a process for determining in real time, easily and at reduced cost, the behavior of a craft, in particular of an aircraft, doing so throughout the domain of operation of this craft.

For this purpose, according to the invention, said process is noteworthy in that the following successive operations are carried out repetitively:

a) a vector $\lambda$ illustrating an equilibrium state is determined from a current linear model modeling the behavior of the craft;

b) the values at equilibrium of parameters of said linear model are determined from this vector $\lambda$;

c) the dynamic component of the behavior of the craft is calculated from at least some of these values; and d) this dynamic component is introduced into said linear model to obtain a new current linear model and to deduce the behavior of said craft therefrom.

Thus, by virtue of the invention, a linear model is used which exhibits numerous advantages (simplicity, speed of calculation, etc.), as stated above. Moreover, by virtue of its continual updating, this linear model can be used without restriction throughout the domain of operation (flight domain in the case of an aircraft) of the craft.

Moreover, said process according to the invention can be implemented for any type of craft (helicopter, airplane, automobile, rocket, missile, etc.) flying or otherwise.

Advantageously, the parameters of the linear model, whose values are determined in step b), are:

- a state vector;
- a control vector;
- an observation vector;
- a state matrix;
- a control matrix; and
- an observation matrix.

According to the invention, the values of said parameters are determined in step b):

α) with the aid of a nonlinear model, this however being fairly unwieldy, since it is necessary to determine the values at each cycle; or β) with the aid of a pre-established database; or γ) with the aid of relations, for example polynomial regressions which make it possible to define these parameters directly from the vector $\lambda$, this corresponding to a simplified mode of deployment; or δ) with the aid of a combination of at least two of the above methods α), β) and γ).

The database (used in the aforesaid method β) can be updated at will without constraint (on the dimension of the vectors and matrices of which it is composed) other than the capacity of the computer used. According to the invention, this database can be established:

- either with the aid of a nonlinear model;
- or from measurements carried out during at least one movement of said craft. In the latter case, a model which is particularly faithful to reality is obtained.

The present invention also relates to a device for determining in real time the behavior of a craft, in particular of an aircraft, and capable of implementing the aforesaid process.

According to the invention, said device is noteworthy in that it comprises:
- first means for determining, from a current linear model modeling the behavior of the craft, a vector λ illustrating an equilibrium state;
- second means connected to said first means, for determining, from this vector λ, the values at equilibrium of parameters of said linear model;
- third means connected to said second means, for calculating, from at least some of these values, the dynamic component of the behavior of the craft; and
- fourth means connected to said first and third means, for introducing this dynamic component into said linear model so as to obtain a new current linear model and to deduce the behavior of said craft therefrom.

BRIEF DESCRIPTION OF THE DRAWINGS

The figures of the appended drawing will clearly elucidate the manner in which the invention may be deployed.

DESCRIPTION OF THE PREFERRED EMBODIMENTS

Figure 1:
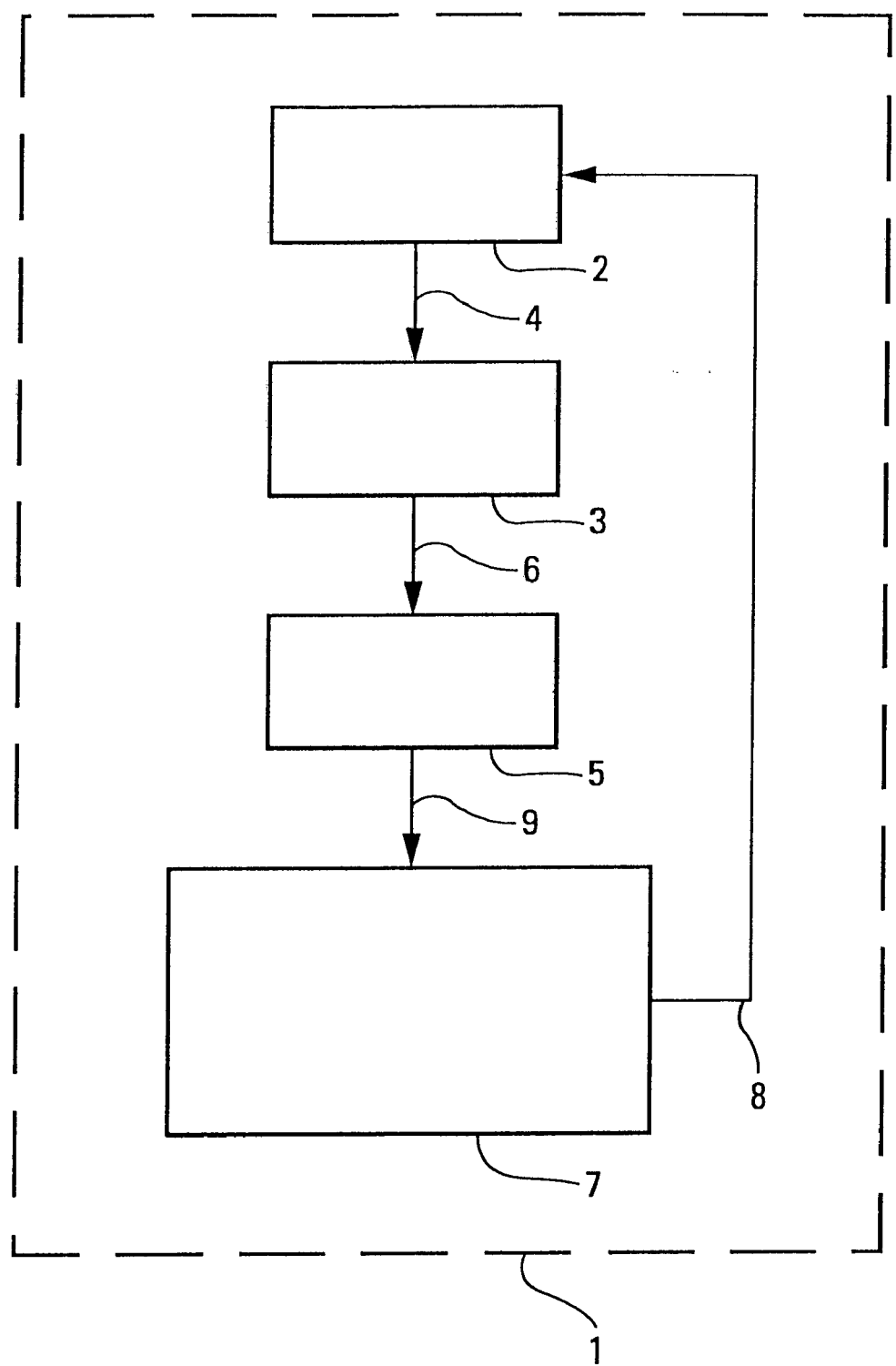
FIG. 1 is the schematic diagram of a device in accordance with the invention.

The device 1 represented diagrammatically in FIG. 1 and in accordance with the invention is intended for determining in real time the behavior of a craft (not represented), in particular of an aircraft and especially of a helicopter.

For this purpose, said device 1 carries out a linear modeling of the movements of the craft, as specified hereinbelow.

First of all, the principle of linearization is illustrated by considering a model governed by nonlinear equations:

$$\begin{cases} \dot{X} = f(X, U) & \text{(state equation)} \\ Y = g(X, U) & \text{(observation equation)} \end{cases}$$

with:
- X: state vector (dimension n)
- U: control vector (dimension m)
- Y: observation vector (dimension p)

The linearization of a nonlinear model is based firstly on an equilibrium. To do this, the following condition is satisfied (knowing that there exists an infinity of possible equilibria):

$$O = f(XO, UO)$$

Through an assumption of small displacements (x, u, y), we obtain, about equilibrium:

X=XO+x
U=UO+u
Y=YO±y.

By a method of differentiation, we estimate the state matrix A, control matrix B and observation matrices C and D of the linear model tangential to the point of equilibrium (XO, UO, YO). This model is governed by the following behavioral law:

$$\begin{cases} \dot{x} = A \cdot x + B \cdot u \\ y = C \cdot x + D \cdot u \end{cases}$$

The components of the matrices A, B, C and D are obtained by differentiation, respectively on the basis of the following relations:

$$\begin{cases} aij = \frac{\partial fi}{\partial Xj}(XO, UO) \\ bij = \frac{\partial fi}{\partial Uj}(XO, UO) \\ cij = \frac{\partial gi}{\partial Xj}(XO, UO) \\ dij = \frac{\partial gi}{\partial Uj}(XO, UO) \end{cases}$$

Said device 1 which implements the process in accordance with the invention and which is, for example, integrated into a computer or embodied in the form of a computer comprises, according to the invention:
- first means 2, for determining, from a current linear model specified hereinbelow, which models the behavior of the craft, a vector λ illustrating an equilibrium state:

$$\lambda = \lambda(X, Y, U);$$

- second means 3 connected by a link 4 to said first means 2, for determining, from this vector λ, the values at equilibrium of parameters [state matrix A, control matrix B, observation matrices C and D, point of equilibrium (XO, UO, YO)] of said linear model:

XO=XO(λ)
UO=UO(λ)
YO=YO(λ)
A=A(λ)
B=B(λ)
C=C(λ)
D=D(λ);

- third means 5 connected by a link 6 to said second means 4, for calculating, from at least some (XO and UO) of these values, the dynamic component of the behavior of the craft:

$$\begin{cases} x = X - XO \\ u = U - UO \end{cases}; \text{ and}$$

- fourth means 7 connected respectively by links 8 and 9 to said first and third means 2 and 5, for introducing this dynamic component into said linear model in such a way as to obtain a new current linear model (and to deduce the behavior of said craft therefrom);

$$\begin{cases} \dfrac{dx}{dt} = A \cdot x + B \cdot u \\ x = \int \left(\dfrac{dx}{dt}\right) \cdot dt \\ y = C \cdot x + D \cdot u \\ X = XO + x \\ Y = YO + y \end{cases}$$

According to the invention, said means 2, 3, 5 and 7 carry out their aforesaid respective processing in a repetitive and successive manner.

The means 7 carry out the implementation of the (isolated) linear model. This corresponds to the part customarily solved and which is valid only for a single point of operation of the craft, in particular for a flight point in the case of an aircraft.

Furthermore, the means 2 and 3 make it possible to identify the equilibrium to which the current operating point (current flight point) [which is contained in the state vector X] is referred. Equilibrium is then characterized by the vector λ. The dimension and the components of this vector λ are fixed as a function of the representativity/complexity ratio sought for the device 1.

It will be noted that, for a helicopter, for example, a good example of components of λ may be the level forward speed VH which, as is known, has a strongly nonlinear effect on the behavior of the helicopter.

Moreover, the means 5 allow, by subtraction, deduction of the dynamic part of the behavior of the craft.

Figure 2:
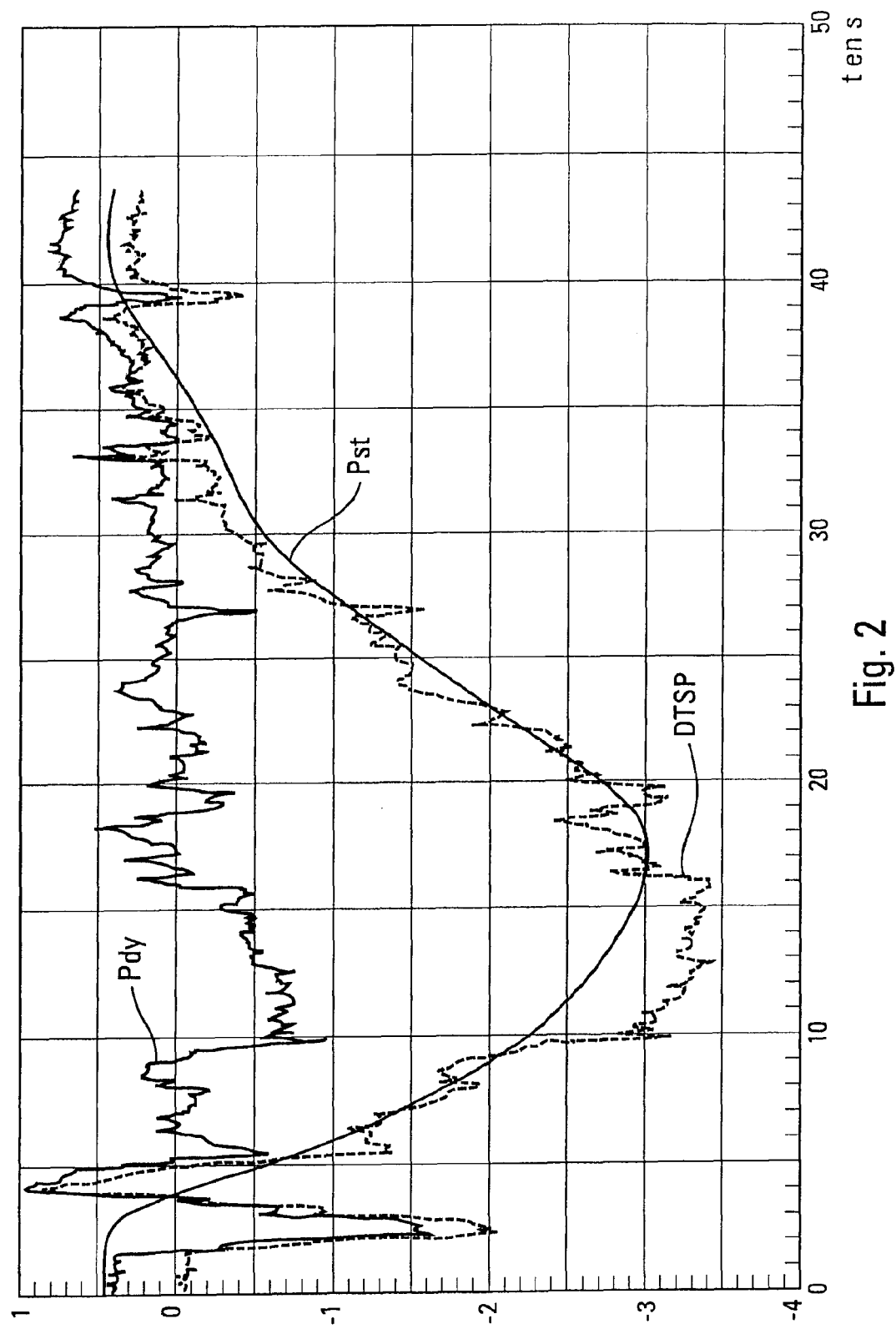
FIG. 2 represents a graft depicting the fluctuations in the pitch control of a helicopter in the course of a stepped acceleration/deceleration, which allows clear demonstration of the action of the process in accordance with the present invention.

FIG. 2 shows an example of the effectiveness of this identification. This FIG. 2 represents, for a helicopter, the fluctuations in the pitch control DTSP in the course of a stepped acceleration/deceleration, as a function of time t expressed in seconds s. The DTSP control is broken down into a static part Pst and a dynamic part Pdy. The static part Pst appears clearly smoothed, the dynamic part Pdy remains, for its part, centered about 0 and contains all the "high-frequency" information. One of the advantages of the process in accordance with the invention (which makes provision for the vector λ characterizing equilibrium) is that this static/dynamic separation is achieved without introducing any delay, whereas had a filter outside the equations being employed, a delay would have been introduced into the identification of XO, UO, YO, strongly degrading the quality of the result. Moreover, an outside filter would have to have been the subject of an adjustment in terms of cutoff frequency, a complicated problem, it being possible for this frequency to vary according to the craft simulated or the operating point. The process in accordance with the invention is optimal, since it implements a self-adapted filtering.

Thus, by virtue of the invention, it is possible for the linear model to be changed in a continuous manner, as a function of the current operating point (current flight point for example). At each instant of implementation of the process, it is possible to identify and to calculate:

the equilibrium XO, UO, YO, to which the operating point is referred;
the parameters of the linear model (matrices A, B, C and D) which are associated with this equilibrium; and
the dynamic Pdy in the state vector X, this portion being the only one which has to be injected into the linear model. This amounts to carrying out a filtering of the state vector X.

The present invention therefore makes it possible to use, in order to determine the behavior of a craft, a linear model which exhibits numerous advantages (simplicity, speed of calculation, etc.), doing so throughout the domain of operation of the craft.

The process in accordance with the invention is intended mainly for real-time applications (piloted simulations). Its use may relate to all types of craft (helicopter, airplane, automobile, rocket, missile, etc.), be they flying or otherwise.

Said linear model may be upgradeable, both in its database and in its level of modeling.

According to the invention, the means 3 determine the values of the parameters A, B, C, D, XO, UO and YO of the linear model:

α) with the aid of a nonlinear model, this however being fairly unwieldy, since it is necessary to determine the values at each cycle; or β) with the aid of a pre-established database; or γ) with the aid of a law, for example a polynomial regression which makes it possible to define these parameters directly from the vector λ, this corresponding to a simplified mode of deployment; or δ) with the aid of a combination of at least two of the above methods α), β) and γ).

The database used in the aforesaid method P can be established:

either with the aid of a nonlinear model;
or by identification with regard to results measured during at least one movement of the craft.

Said database (matrices A, B, C, D and equilibrium vectors XO, UO, YO) can be updated at will without constraint on the dimension of the vectors and of the matrices of which it is composed, other than the capacity of the computer used. Moreover, if this database stems from experimental identifications on a real craft, it is then possible with the corresponding model to reproduce a behavior which is extremely close to reality.

Just like a standard nonlinear model, the model can receive additional calculation modules intended for enhancing its representativity. In the case of a helicopter, the following adaptations may be cited by way of example:

consideration of the effect of the wind;
consideration of the ground effect;
addition of a landing gear model.

What is claimed is:

1. A process for determining in real time the behavior of a craft, wherein the following successive operations are carried out repetitively:

a) a vector λ illustrating an equilibrium state is determined from a current linear model modeling the behavior of the craft;

b) the values at equilibrium of parameters of said linear model are determined from the vector λ;

c) the dynamic component of the behavior of the craft is calculated from at least some of the parameter values; and d) the dynamic component is introduced into said linear model to obtain a new current linear model and to deduce the behavior of said craft therefrom.

2. The process as claimed in claim 1, wherein the parameters of thin linear model, whose values are determined in step b), are:
- a state vector;
- a control vector;
- an observation vector;
- a state matrix;
- a control matrix; and
- an observation matrix.

3. The process as claimed in claim 1, wherein, in step b), the values of said parameters of the linear model are determined at least with the aid of a nonlinear model.

4. The process as claimed in claim 1, wherein, in step b), the values of said parameters of the linear model are determined at least with the aid of at least one pre-established database.

5. The process as claimed in claim 4, wherein said database is established with the aid of a nonlinear model.

6. The process as claimed in claim 4, wherein said database is established from measurements carried out during at least one movement of said craft.

7. The process as claimed in claim 1, wherein, in step b), the values of said parameters of the linear model are determined at least with the aid of relations making it possible to define said parameters directly from the vector $\lambda$.

8. A device for determining in real time the behavior of a craft, which device comprises:
- first means for determining, from a current linear model modeling the behavior of the craft, a vector $\lambda$ illustrating an equilibrium state;
- second means connected to said first means, for determining, from the vector $\lambda$, the values at equilibrium of parameters of said linear model;
- third means connected to said second means, for calculating, from at least some of the parameter values, the dynamic component of the behavior of the craft; and
- fourth means connected to said first and third means, for introducing the dynamic component into said linear model so as to obtain a new current linear model and to deduce the behavior of said craft therefrom.

* * * * *